(12) United States Patent
Beadle et al.

(10) Patent No.: US 6,233,725 B1
(45) Date of Patent: May 15, 2001

(54) METHOD AND APPARATUS TO COORDINATE AND CONTROL THE SIMULTANEOUS USE OF MULTIPLE JUST IN TIME COMPILERS WITH A JAVA VIRTUAL MACHINE

(75) Inventors: Bruce Anthony Beadle, Round Rock; Michael Wayne Brown, Georgetown; Michael Anthony Paolini; Douglas Scott Rothert, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,513

(22) Filed: Dec. 3, 1998

(51) Int. Cl.$^7$ ........................................ G06F 17/30
(52) U.S. Cl. .................................... 717/1; 707/3
(58) Field of Search ............................. 717/1; 707/103; 712/202

(56) References Cited

U.S. PATENT DOCUMENTS

| | | | |
|---|---|---|---|
| 5,925,123 | * 7/1999 | Tremblay | 712/23 |
| 5,961,586 | * 10/1999 | Pedersen | 709/227 |
| 5,970,242 | * 10/1999 | Oconner | 717/1 |
| 6,003,038 | * 12/1999 | Chen | 707/103 |
| 6,014,723 | * 1/2000 | Tremblay | 711/1 |
| 6,021,469 | * 2/2000 | Tremblay | 711/110 |
| 6,026,485 | * 2/2000 | O'Conner | 712/226 |
| 6,038,643 | * 3/2000 | Tremblay | 711/132 |
| 6,049,807 | * 4/2000 | Carroll | 707/201 |
| 6,065,108 | * 5/2000 | Tremblay | 712/201 |
| 6,076,141 | * 6/2000 | Tremblay | 711/108 |
| 6,125,439 | * 9/2000 | Tremblay | 712/202 |
| 6,148,391 | * 11/2000 | Petrick | 712/202 |

* cited by examiner

*Primary Examiner*—Paul R. Lintz
(74) *Attorney, Agent, or Firm*—Duke W. Yee; Jeffrey S. LaBaw

(57) ABSTRACT

A method and apparatus for providing a process in a data processing system for executing bytecodes. A call to just in time compile bytecodes is intercepted. A just in time compiler is selected from a plurality of just in time compilers to compile the bytecodes, wherein the just in time compiler is a selected just in time compiler. The bytecodes are sent to the selected just in time compiler for processing.

40 Claims, 2 Drawing Sheets

FIG. 3
| | | |
|---|---|---|
| CLASS/METHOD A | JITa | 302 |
| CLASS/METHOD B | JITd | 304 |
| CLASS/METHOD C | JITc | 306 |
| CLASS/METHOD D | JITd | 308 |
| CLASS/METHOD E | JITa | 310 |
| CLASS/METHOD F | JITb | 312 |
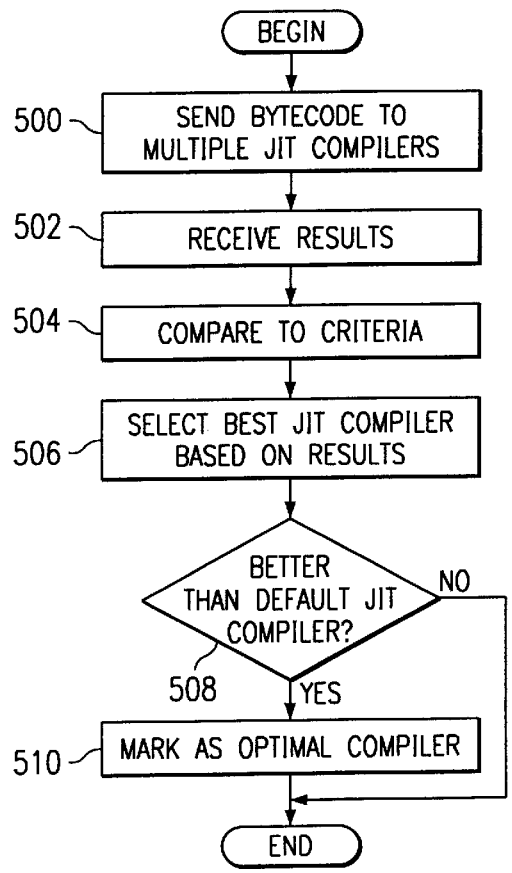
FIG. 5
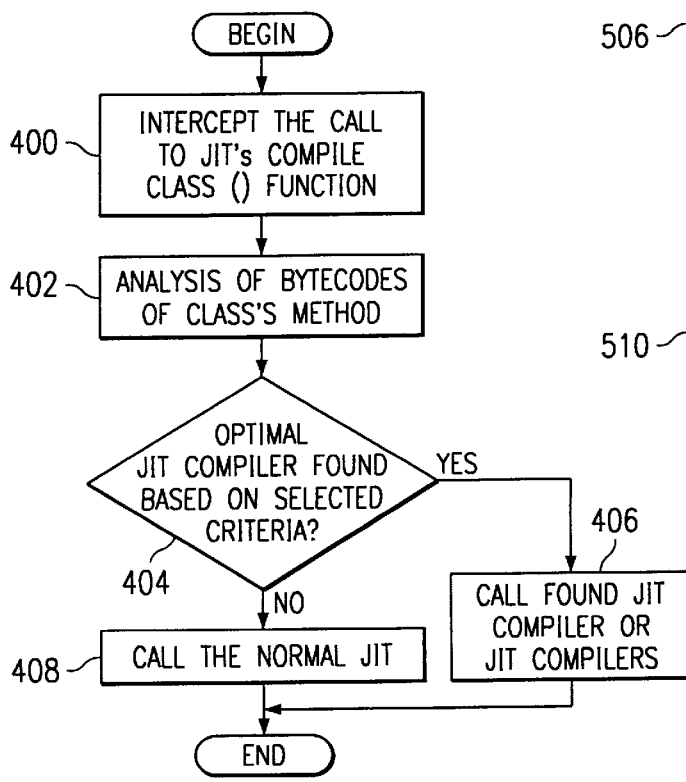
FIG. 4

METHOD AND APPARATUS TO COORDINATE AND CONTROL THE SIMULTANEOUS USE OF MULTIPLE JUST IN TIME COMPILERS WITH A JAVA VIRTUAL MACHINE

CROSS REFERENCE TO RELATED APPLICATIONS

The present invention is related to applications entitled A Method And Apparatus To Selectively Control Processing Of A Method In A Java Virtual Machine, Ser. No. 09/204,512; Method And Apparatus For Automatic Service Of JIT Compiler Generated Errors, Ser. No. 09/204,511; Method And Apparatus For Dynamically Selecting Bytecodes For Just In Time Compiling In A User's Environment, Ser. No. 09/127,337; A Method And Apparatus For Dynamic Selection Of Which Bytecodes Should Be Just In Time Compiled, Ser. No. 09/204,519; JIT/Compiler Java Language Extensions To Enable Field Performance and Serviceability, Ser. No. 09/204,968; A Method And Apparatus To Selectively Control Processing Of A Method In A Java Virtual Machine, Ser. No. 09/204,512; and Method And Apparatus For Dynamic Selection Of Instructions For Compiling Using Tags, Ser. No. 09/204,516, all of which are filed even date hereof, assigned to the same assignee, and incorporated herein by reference.

BACKGROUND OF THE INVENTION

1. Technical Field

The present invention relates generally to an improved data processing system and in particular to an improved method and apparatus for processing a method in a Java virtual machine. Still more particularly, the present invention relates to a method and apparatus for coordinating and controlling the simultaneous use of multiple just in time compilers in an instance of a JVM.

2. Description of Related Art

Java is an object oriented programming language and environment focusing on defining data as objects and the methods that may be applied to those objects. Java is designed to solve a number of problems in modern programming practice. Java is able to support applications for many types of data processing systems, which may contain a variety of central processing units and operating systems architectures. To enable a Java application to execute on different types of data processing systems, a compiler typically generates an architecture-neutral file format—the compiled code is executable on many processors, given the presence of the Java run time system. The Java compiler generates bytecode instructions that are non-specific to a particular computer architecture. A bytecode is a machine independent code generated by the Java compiler and executed by a Java interpreter. A Java interpreter is a module that alternately decodes and executes a bytecode. The decoding of the bytecode places the instruction into an executable form for the computer on which the code is to be executed. Then, the instruction is executed by the computer. These bytecode instructions are designed to be easy to interpret on any machine and easily translated on the fly into native machine code.

The Java virtual machine (JVM) is a virtual computer component that resides only in memory. A JVM includes components necessary to run a program on a computer, including an interpreter. The JVM allows Java programs to be executed on different platforms as opposed to only the one platform for which the code was compiled. Java programs are compiled for the JVM. In this manner, Java is able to support applications for many types of data processing systems, which may contain a variety of central processing units and operating systems architectures.

In performance critical environments, sometimes it is necessary to rely on specialized just in time (JIT) compilers to generate different just in time compiled code for different circumstances. For example, some just in time compilers are optimized for processing loops in bytecodes. In other instances, some just in time compilers may cause errors or unpredictable results in compiling bytecodes into code for use on the client computer. Currently, use of a different just in time compiler requires reinitializing the JVM with different options. No mechanism is present to provide more than one just in time compiler per instance of a JVM. Whenever a program uses Java, a new instance of the JVM is instantiated. Each JVM is designed to handle one process. Thus, it would be advantageous to have an apparatus for providing multiple just in time compilers to an instance of a JVM.

SUMMARY OF THE INVENTION

The present invention provides a process in a data processing system for executing bytecodes. A call to just in time compile bytecodes is intercepted. A just in time compiler is selected from a plurality of just in time compilers to compile the bytecodes, wherein the just in time compiler is a selected just in time compiler. The bytecodes are sent to the selected just in time compiler for processing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an example of a data structure containing user specified data for class/method information in accordance with a preferred embodiment of the present invention;

FIG. 4 is a flowchart of a process used to control the use of multiple JIT compilers in accordance with a preferred embodiment of the present invention; and FIG. 5 is a flowchart of a process for analyzing bytecodes in accordance with a preferred embodiment of the present invention.

DETAILED DESCRIPTION OF THE PREFERRED EMBODIMENT

Figure 1:
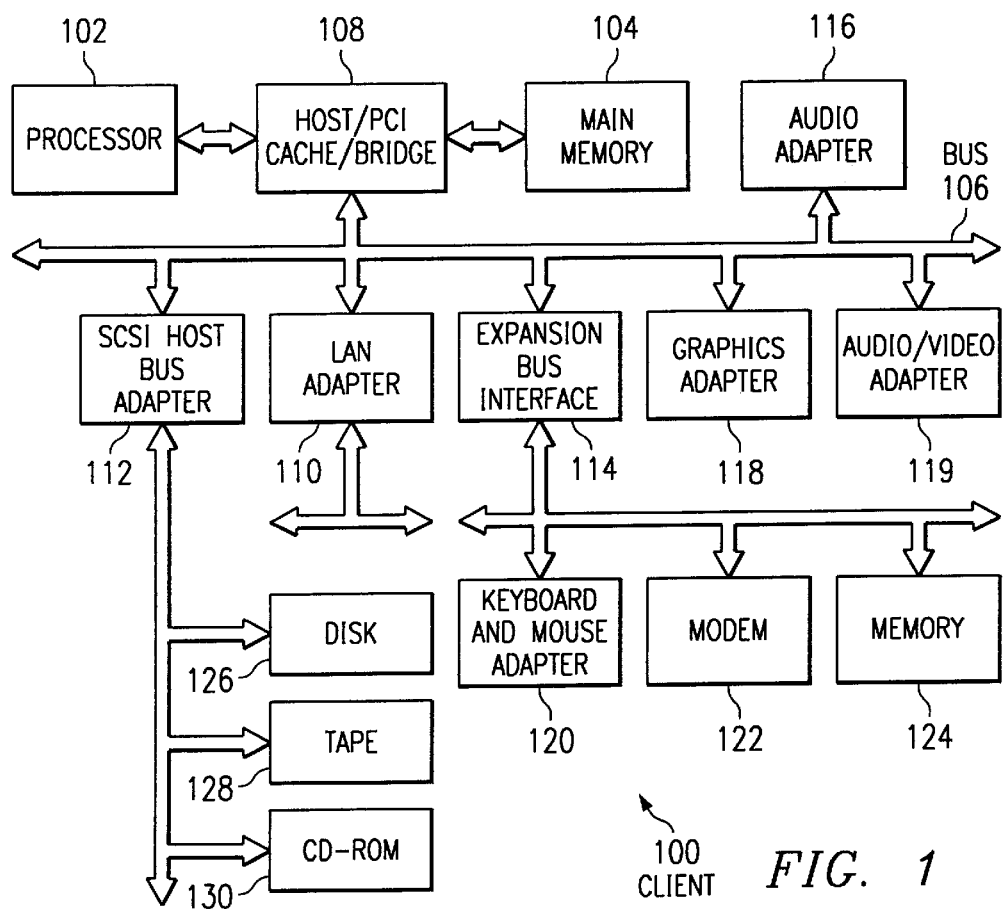
FIG. 1 is a block diagram of a data processing system in which the present invention may be implemented.

With reference now to FIG. 1, a block diagram of a data processing system in which the present invention may be implemented is illustrated. Data processing system 100 is an example of a client computer. Data processing system 100 employs a peripheral component interconnect (PCI) local bus architecture. Although the depicted example employs a PCI bus, other bus architectures such as Micro Channel and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110: Small Computer System Interface (SCSI) host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection for hard disk drive 126, tape drive 128, and CD-ROM drive 130 in the depicted example. Typical PCI local bus implementations will support three or four PCI expansion slots or add-in connectors. An operating system runs on processor 102 and is used to coordinate and provide control of various components within data processing system 100 in FIG. 1. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 100. Instructions for the operating system, the object-oriented operating system, and applications or programs are located on storage devices, such as hard disk drive 126 and may be loaded into main memory 104 for execution by processor 102.

Those of ordinary skill in the art will appreciate that the hardware in FIG. 1 may vary depending on the implementation. For example, other peripheral devices, such as optical disk drives and the like may be used in addition to or in place of the hardware depicted in FIG. 1. The depicted example is not meant to imply architectural limitations with respect to the present invention. For example, the processes of the present invention may be applied to multiprocessor data processing systems. The present invention provides a method, apparatus, and instructions for providing multiple just in time compilers to a Java virtual machine.

The present invention provides an interface that receives or intercepts a call to the just in time compiler. The interface identifies an appropriate just in time compiler for use to compile the particular method or class and forwards the just in time compiler. In this manner, a specific just in time compiler may be specified for particular methods or classes. For example, a just in time compiler specialized in loop optimizations for specific methods that may contain many loops may be specified instead of the normal just in time compiler. The default or normal just in time compiler may be used to compile all other methods encountered by the JVM. This allows developers to target specific code patterns instead of attempting to create an all-purpose just in time compiler.

Figure 2:
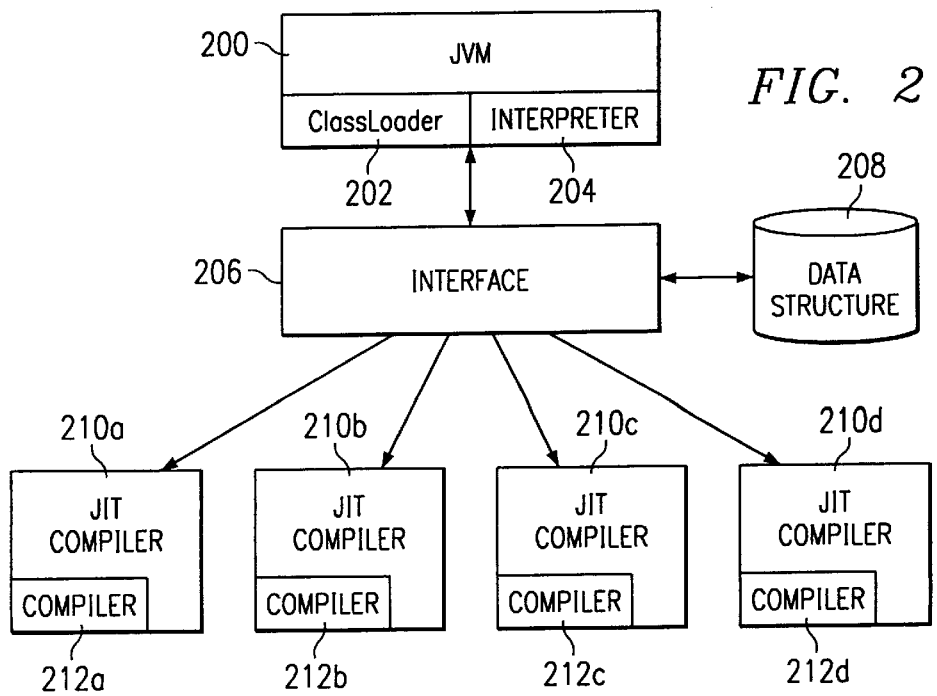
FIG. 2 is a diagram of components used to selectively process methods in accordance with a preferred embodiment of the present invention.

With reference now to FIG. 2, a diagram of components used to selectively process methods is depicted in accordance with a preferred embodiment of the present invention. In this example, JVM 200 includes a class loader 202 and interpreter 204. Interface 206 is the component containing the mechanism and process of the present invention. Data structure 208 is used by interface 206 to determine whether or not to just in time (JIT) compile a method. Also shown in FIG. 2 are JIT compilers 210a–210d, which include compiler units 212a–212d. JVM 200 and JIT compiler 210 contain other components, which are not shown to avoid obscuring the description of the present invention.

JVM 200 will start execution by invoking a method of a specified class. In the depicted example, this method may be for example, main. The method may be passed by a single argument in the form of an array of strings. This causes the specified class to be loaded, linked to other types that it uses, and initialized. The loading of a class involves finding the binary form of a class or interface type with a particular name. In the depicted example, the loading process is implemented by class loader 202. Class loader 202 in this example includes a ClassLoader class, which includes methods for loading new classes into the Java runtime environment. Interpreter 204 is a program that translates the bytecode to a native instruction and then executes the native instructions. The bytecode is translated into a form executable by the computer on which the JVM is located. Compiler units 212a–212d each incorporate a compiler class, which includes methods for compiling methods to native instructions prior to execution. In this example, the compilation by compilers 212a–212d occurs only once per method. Some JIT compilers may compile entire classes, rather than one method at a time. A specific class or method may be compiled by passing an instance of the method or class to compiler unit, such as compiler 212a in JIT compiler 210a.

Interface 206 receives the call or passing of the method destined for JIT compiler 210. Interface 206 may receive or intercepts the method being passed to JIT compiler 210 by registering itself as a JIT compiler that is to receive the method from JVM 200 in place of JIT compiler 210. The method is received from JVM 200 by interface 206 through a compile class API invoked by interpreter 204 in JVM 200. Interface 206 takes the method information received from class loader 202 and determines which JIT compiler will compile the method. This determination may be made by comparing the method name to a list or table of methods in data structure 208, which contains information about methods, classes, and/or bytecode patterns, along with an identification of a JIT compiler that should be used to compile specific classes, methods, and/or bytecode patterns. Alternatively, the class name or bytecode patterns may be used to select an appropriate JIT compiler. The method is then passed on to the appropriate JIT compiler 210. Alternatively, interface 206 may place a call to have interpreter 204 interpret the method, or processing of the method may be terminated.

In FIG. 3, an example of a data structure containing user specified data for class/method information is depicted in accordance with a preferred embodiment of the present invention. Data structure 300 includes a number of entries 302–312 in which each entry identifies a class, method, or bytecode pattern along with a just in time compiler. In entry 302, class/method/bytecode pattern A is associated with JIT compiler JIT a (JIT compiler 210a). If interface 206 encounters class/method/bytecode pattern A, JIT compiler JIT a will be selected as the JIT compiler to receive the code for compiling. If the class, method, or bytecode pattern is identified as class/method/bytecode pattern B then JIT compiler JIT d (JIT compiler 210d) will be selected as the JIT compiler to receive the bytecodes for compiling. The analysis of the bytecodes may be based on the particular class or method in which the bytecodes reside. Alternatively, the bytecode pattern itself may be used as a basis to select a particular JIT compiler for processing the bytecodes. If an entry is not found for a particular method, class, or bytecode pattern, then the bytecodes will be sent to a default JIT compiler. For example, JIT compiler 210a is the default JIT compiler in the instance that an entry for a particular method, class, bytecode pattern cannot be found in data structure 208.

With reference now to FIG. 4, a flowchart of a process used to control the use of multiple JIT compilers is depicted in accordance with a preferred embodiment of the present invention. The process begins by intercepting a call to the JIT compiler's compile class function (step 400). Next, an analysis of the bytecodes of the class method is made (step 402). This analysis may be based on the bytecode pattern, the method name, or the class name depending on the implementation. The analysis involves identifying whether the particular class, method, or bytecode pattern is found in data structure 300 in FIG. 3. A determination is then made as to whether an optimal JIT compiler has been found based on the selected criteria (step 404). If an optimal JIT compiler has been found, the call is made to that JIT compiler (step 406). In addition, step 406 may send the method to multiple JIT compilers. For example, the method may be sent to multiple JIT compilers to find the JIT compiler that returns just in time compiled code, also referred to as JITed code, in the shortest period of time. Multiple JIT compilers may be used to identify a JIT compiler that returns code with the smallest memory size or footprint. In addition, the method may be sent to multiple JIT compilers to identify "fall back positions" such that in case the first JIT compiler produces flawed code. Multiple instances of the same JIT compiler may be passed different parameters to different results, such as quickest compile, quickest execution code, and smallest memory footprint. Multiple JIT compilers also may be used in the situation in which a first JIT compiler is passed a method in a class while a second JIT compiler is passed the entire class for compiling. In this situation, a needed method may be compiled by the first JIT compiler for use sooner than other methods, not currently needed, within the class being compiled by the second JIT compiler. With reference again to step 404, if an optimal JIT compiler has not been found in the data structure based on the selected criteria, then the normal or default JIT compiler is called to process the bytecodes (step 408) with the process terminating thereafter.

Turning next to FIG. 5, a flowchart of a process for analyzing bytecodes is depicted in accordance with a preferred embodiment of the present invention. FIG. 5 is a more detailed flowchart of step 402 in FIG. 4. This process is used to identify a just in time compiler for use in compiling the bytecodes. The process begins by sending the bytecodes to multiple JIT compilers (step 500). The multiple JIT compilers in the depicted example are each different from the others. For example, one JIT compiler may be designed for loop optimizations in specific methods that contain many loops, while another JIT compiler may be designed to produce code with reduced size as compared to other JIT compilers. The process receives the results from the JIT compiler (step 502). These results are compared to selected criteria (step 504). The criteria may be based on a number depending on the implementation. For example, if memory resources are scarce, the criteria may be to select the JIT compiler returning the smallest compiled code. If the method or class is to be executed many times, the criteria may be to select code generated by a JIT compiler that is optimized for speed. The process then selects the best JIT compiler based on a comparison of the results to the criteria (step 506). A determination is then made as to whether the selected JIT compiler provides better performance than the default JIT compiler based on the selected criteria (step 508). If the selected JIT compiler provides better results, then a selected JIT compiler is marked as the optimal JIT compiler (step 510) with the process terminating thereafter. Otherwise, an optimal JIT compiler has not been found. This step provides a result for the decision made in step 404 in FIG. 4.

The process in FIG. 5 may be implemented in a symmetric multiprocessing (SMP) environment, which is a computer architecture in which multiple processors share the same memory, which contains one copy of the operating system, one copy of any applications that are in use, and one copy of the data. Because the operating system divides the workload into tasks and assigns those tasks to whatever processors are free, SMP reduces transaction time. In such an environment, the code may be executed interpretively while the code is also sent to any available JIT compilers. In this manner, results may be returned quickly to check for smallest compile size if optimizing for size. Additionally, in such an environment, parallel execution performance checks may be used to select the JIT compiler performing the fastest compilation when speed of compilation is an important factor.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, although the depicted embodiment is directed towards processing bytecodes in Java, the processes of the present invention may be applied to other programming languages and environments that process instructions, which are non-specific to a computer on which the instructions are to be executed. In such a case, a virtual machine on the computer may interpret the instructions or send the instructions to a compiler to generate code suitable for execution by the computer on which the virtual machine is located. The embodiment was chosen and described in order to best explain the principles of the invention, the practical application, and to enable others of ordinary skill in the art to understand the invention for various embodiments with various modifications as are suited to the particular use contemplated.

What is claimed is:

1. A process in a data processing system for executing bytecodes, the method comprising the data processing system implemented steps of:

intercepting a call to just in time compile bytecodes;

selecting a just in time compiler from a plurality of just in time compilers, wherein the just in time compiler is a selected just in time compiler; and sending the bytecodes to the selected just in time compiler for processing.

2. The method of claim 1, further comprising:

sending the bytecodes to each of the plurality of just in time compilers for compilation;

receiving compiled code from each of the plurality of just in time compilers; and comparing the compiled code from each of the just in time compilers to a criteria to generate a comparison of the just in time compilers.

3. The method of claim 2, wherein the step of selecting comprises:

selecting a just in time compiler from the plurality of just in time compilers based on the comparison of the just in time compilers.

4. The method of claim 3, wherein the criteria is speed of compilation by a just in time compiler.

5. The method of claim 3, wherein the criteria is a size of code generated by a just in time compiler.

6. The method of claim 3, wherein the criteria is loop optimization in a method.

7. The process of claim 1, wherein the bytecodes form a method.

8. The process of claim 7, wherein the selecting step comprises:

comparing the method to information about a plurality of methods; and selecting a just in time compiler based on the information about the plurality of methods, wherein the just in time compiler is a selected just in time compiler.

9. The process of claim 1, wherein the step of selecting comprises:

analyzing the bytecodes; and selecting a just in time compiler from a plurality of just in time compilers based on the analysis of the bytecodes.

10. The process of claim 1, wherein the plurality of just in time compilers includes a just in time compiler designed for loop optimization.

11. The process of claim 1, wherein the bytecodes have a pattern and wherein the selecting step comprises:

comparing the bytecodes to a plurality of bytecode patterns; and selecting a just in time compiler based on the information about the plurality of bytecode patterns, wherein the just in time compiler is a selected just in time compiler.

12. The process of claim 1, wherein the data processing system includes a Java virtual machine and wherein the process intercepts what is located in an interface registered as a just in time compiler with the Java virtual machine.

13. A process in a computer for executing nonspecific instructions, wherein the nonspecific instructions are nonspecific to the computer, the method comprising the computer implemented steps of:

intercepting a call to a compiler to process the nonspecific instructions, wherein the compiler generates instructions for execution by the computer;

selecting a compiler from the plurality of compilers based on the nonspecific instructions, wherein each of the plurality of compilers are used to generate instructions specific to the computer and wherein the compiler is a selected just in time compiler; and sending the nonspecific instructions to the selected compiler for processing.

14. The process of claim 13, wherein the nonspecific instructions are bytecodes.

15. The process of claim 14, wherein the bytecodes form a method.

16. The process of claim 13, wherein the compiler is a Java just in time compiler.

17. The process of claim 13, wherein the nonspecific instructions have a pattern and wherein the compiler is selected based on the pattern.

18. The process of claim 13, wherein the nonspecific instructions are part of a method and wherein the compiler is selected based on the method.

19. The process of claim 13, wherein the nonspecific instructions are part of a class and wherein the compiler is selected based on the class.

20. A data processing system for executing bytecodes, the data processing system comprising:

intercepting means for intercepting a call to just in time compile bytecodes;

selecting means for selecting a just in time compiler from a plurality of just in time compilers, wherein the just in time compiler is a selected just in time compiler; and sending means for sending the bytecodes to the selected just in time compiler for processing.

21. The data processing system of claim 20 further comprising:

sending means for sending the bytecodes to each of the plurality of just in time compilers for compilation;

receiving means for receiving compiled code from each of the plurality of just in time compilers; and comparing means for comparing the compiled code from each of the just in time compilers to a criteria to generate a comparison of the just in time compilers.

22. The data processing system of claim 21, wherein selecting comprises:

selecting means for selecting a just in time compiler from the plurality of just in time compilers based on the comparison of the just in time compilers.

23. The data processing system of claim 22, wherein the criteria is speed of compilation by a just in time compiler.

24. The data processing system of claim 22, wherein the criteria is a size of code generated by a just in time compiler.

25. The data processing system of claim 22, wherein the criteria is loop optimization in a method.

26. The data processing system of claim 20, wherein the bytecodes form a method.

27. The data processing system of claim 20, wherein selecting comprises:

comparing means for comparing the method to information about a plurality of methods; and selecting means for selecting a just in time compiler based on the information about the plurality of methods, wherein the just in time compiler is a selected just in time compiler.

28. The data processing system of claim 20, wherein selecting comprises:

analyzing means for analyzing the bytecodes; and selecting means for selecting a just in time compiler from a plurality of just in time compilers based on the analysis of the bytecodes.

29. The data processing system of claim 20, wherein the plurality of just in time compilers includes a just in time compiler designed for loop optimization.

30. The data processing system of claim 20, wherein the bytecodes have a pattern and wherein selecting comprises:

comparing means for comparing the bytecodes to a plurality of bytecode patterns; and selecting means for selecting a just in time compiler based on the information about the plurality of bytecode patterns, wherein the just in time compiler is a selected just in time compiler.

31. The data processing system of claim 20, wherein the data processing system includes a Java virtual machine and wherein the process intercepts what is located in an interface registered as a just in time compiler with the Java virtual machine.

32. A data processing system in a computer for executing nonspecific instructions, wherein the nonspecific instructions are nonspecific to the computer, the data processing system comprising:

intercepting means for intercepting a call to a compiler to process the nonspecific instructions, wherein the compiler generates instructions for execution by the computer;

selecting means for selecting a compiler from the plurality of compilers based on the nonspecific instructions, wherein each of the plurality of compilers are used to generate instructions specific to the computer wherein the compiler is a selected just in time compiler; and sending means for sending the nonspecific instructions to the selected compiler for processing.

33. The data processing system of claim 32, wherein the nonspecific instructions are bytecodes.

34. The data processing system of claim 33, wherein the bytecodes form a method.

35. The data processing system of claim 32, wherein the compiler is a Java just in time compiler.

36. The data processing system of claim 32, wherein the nonspecific instructions have a pattern and wherein the compiler is selected based on the pattern.

37. The data processing system of claim 32, wherein the nonspecific instructions are part of a method and wherein the compiler is selected based on the method.

38. The data processing system of claim 32, wherein the nonspecific instructions have a part of a class and wherein the compiler is selected based on the class.

39. A computer program product for executing bytecodes, the computer program product comprising:

first instructions for intercepting a call to just in time compile bytecodes;

second instructions for selecting a just in time compiler from a plurality of just in time compilers, wherein the just in time compiler is a selected just in time compiler; and third instructions for sending the bytecodes to the selected just in time compiler for processing.

40. A computer program product in a computer for executing nonspecific instructions, wherein the nonspecific instructions are nonspecific to the computer, the computer program product comprising the computer implemented steps of:

first instructions for intercepting a call to a compiler to process the nonspecific instructions, wherein the compiler generates instructions for execution by the computer;

second instructions for selecting a compiler from the plurality of compilers based on the nonspecific instructions, wherein each of the plurality of compilers are used to generate instructions specific to the computer and wherein the compiler is a selected just in time compiler; and third instructions for sending the nonspecific instructions to the selected compiler for processing.

* * * * *